United States Patent [19]

Green

[11] Patent Number: 5,374,162
[45] Date of Patent: Dec. 20, 1994

[54] AIRFOIL HAVING COOLABLE LEADING EDGE REGION

[75] Inventor: Dennis J. Green, Amston, Conn.

[73] Assignee: United Technologies Corporation, Hartford, Conn.

[21] Appl. No.: 159,874

[22] Filed: Nov. 30, 1993

[51] Int. Cl.⁵ .............................................. F01D 5/18
[52] U.S. Cl. .................................... 416/97 R; 415/115
[58] Field of Search .......................... 416/97 R, 97 A; 415/115

[56] References Cited

U.S. PATENT DOCUMENTS

| | | | |
|---|---|---|---|
| 4,257,737 | 3/1981 | Andress et al. | 416/97 R |
| 4,474,532 | 10/1984 | Pazder . | |
| 4,753,575 | 6/1988 | Levengood et al. . | |
| 5,096,379 | 3/1992 | Stroud et al. | 416/97 R |
| 5,193,975 | 3/1993 | Bird et al. | 416/97 R |
| 5,271,715 | 12/1993 | Zelesky et al. | 416/97 R |

FOREIGN PATENT DOCUMENTS

466501   1/1992   European Pat. Off. .......... 416/97 R

Primary Examiner—John T. Kwon
Assistant Examiner—James A. Larson
Attorney, Agent, or Firm—Gene D. Fleischhauer

[57] ABSTRACT

A coolable rotor blade 16 having an airfoil section 18 is disclosed. Various construction details are developed which increase the cooling effectiveness under the airfoil section 18 under a variety of operative conditions. In one detailed embodiment, an array of rows of cooling air holes has two staggered rows in the spanwise direction which are spaced spanwisely in the row and chordwisely from row to row in a predetermined manner to ensure adequate cooling to the leading edge region should the aerodynamic leading edge shift.

9 Claims, 4 Drawing Sheets

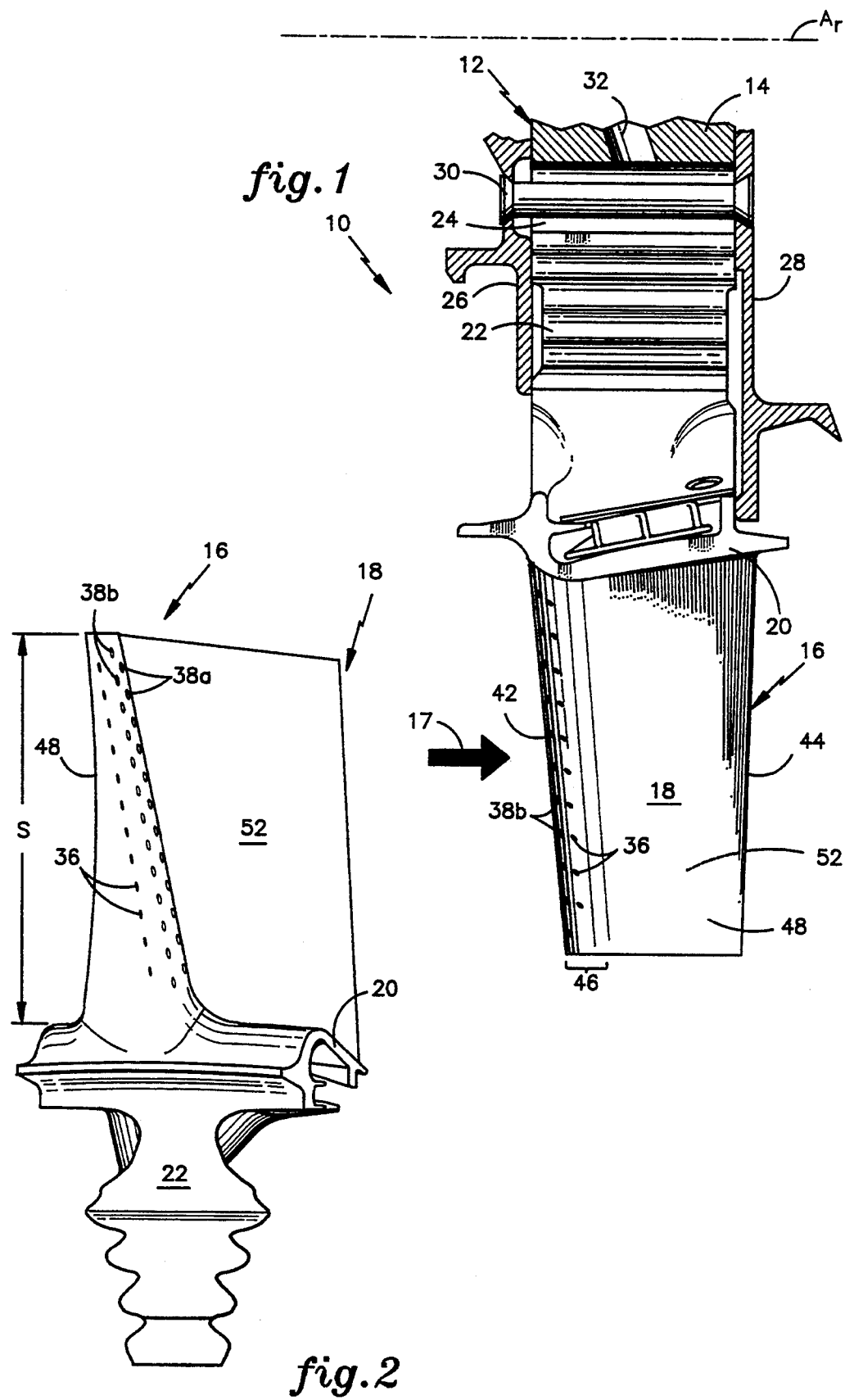

AIRFOIL HAVING COOLABLE LEADING EDGE REGION

TECHNICAL FIELD

This invention relates to a coolable airfoil for use in a high-temperature, rotary machine and, more specifically, to an airfoil having a film cooled leading edge region. The concepts disclosed have application to both turbine vanes and turbine blades.

BACKGROUND ART

Rotary machines such as gas turbine engines include a turbine section. The turbine section has a rotor assembly which includes a rotor disk and a plurality of rotor blades extending radially outwardly from the disk. A flowpath for hot working medium gases extends axially through the rotor assembly and between the rotor blades of the rotor assembly. In modern gas turbine engines the temperature of the working medium gases may approach twenty-five hundred degrees fahrenheit (2,500° F.) at the entrance to the turbine.

Each rotor blade in the forward portion of the turbine has an airfoil section which extends radially outwardly from the rotor assembly and into the working medium flowpath. The airfoil is defined by a plurality of airfoil sections disposed about a spanwisely extending axis. The airfoil adapts the rotor blade to extract energy from the hot working medium gases for driving the rotor assembly about an axis of rotation. Accordingly, each rotor blade is bathed in the hot working medium gases and receives heat from these gases. Heating of the rotor blade causes thermal stresses in the airfoil which, when combined with mechanical stresses resulting from rotation of the blade about the axis of rotation decrease the structural integrity and fatigue life of the airfoil.

Rotor blades at the forward portion of the turbine are coolable to preserve the structural integrity and fatigue life of the airfoil. Cooling air is flowed through passages on the interior of the rotor blade and to the airfoil to remove heat from the airfoil. The cooling air is discharged at the downstream end of the airfoil through openings and from film cooling holes which extend through the surface of the airfoil at preselected locations on the airfoil surface. The cooling air provides convective cooling to the airfoil wall as the cooling air is flowed through the openings. These cooling air holes, commonly referred to as "film cooling holes" also discharge cooling air at the surface of the airfoil. The cooling air extends as a film over a portion of the airfoil at critical locations to provide a layer of cool air which blocks the hot working medium gases from contacting the surface of the airfoil, thus decreasing the transfer of heat to the airfoil at critical locations.

One example of an airfoil in which cooling air is flowed through the interior of the airfoil and discharged to the exterior at critical locations is shown in U.S. Pat. No. 4,474,532 issued to Pazder, entitled *Coolable Airfoil for a Rotary Machine*. In Pazder, the airfoil includes a leading edge 34 and a trailing edge 36, a suction sidewall 38, and a pressure sidewall 42 are joined at the leading edge region and the trailing edge region. In the leading edge region, cooling air holes extend from the interior to the exterior to discharge cooling air in this region of the airfoil.

Another example is shown in U.S. Pat. No. 4,753,575 issued to Levengood et al., entitled *Airfoil with Nested Cooling Channels*. As shown in Levengood, the forward most portion of the airfoil may have three (3) or more cooling air holes as illustrated in FIG. 2 and FIG. 6 which correspond to the sections 2—2 (three (3) cooling air holes) in FIG. 1 and the section 6-6 (four (4) cooling air holes) in FIG. 5.

In modern gas turbine engines, the film cooling holes in the leading edge region are typically located relative to the predicted stagnation point of gas path air. The stagnation point for any airfoil section under a particular operative condition is the point on the airfoil at which the hot working medium gases impact the airfoil and have the minimum (theoretically zero) velocity. Working medium gases impacting the airfoil on one chordwise side of the stagnation point are flowed toward the trailing edge of the airfoil on the suction side of the airfoil. Working medium gases impacting the airfoil on the other chordwise side of the stagnation point flow are flowed toward the trailing edge on the pressure side of the airfoil. A line connecting the series of stagnation points in the spanwise direction forms the aerodynamic leading edge of the airfoil. As will be realized, the aerodynamic stagnation point is a function of the angle of attack of the approaching flow. The angle of attack changes for different operative conditions of the engine and varies the location of the aerodynamic leading edge. This is different from the forward most portion of an airfoil section which is commonly referred to as the mechanical stagnation point of the airfoil section. A line connecting the mechanical stagnation points of the airfoil forms the mechanical leading edge (commonly referred to simply as the "leading edge") of the airfoil. The location of this leading edge never changes. Because modern airfoils encounter pressure and temperature gradients in the oncoming flow and because the airfoils do have a leading edge which is angled somewhat in a spanwise direction to a radial line, the aerodynamic leading edge tends to curl around the leading edge in an S shape.

The prior art teaches disposing rows of film cooling holes in the airfoil in the leading edge region in a way that avoids the line of the most troublesome aerodynamic stagnation points. This aerodynamic leading edge connecting these points occurs at the operative condition of the turbine that has the highest temperature in the gas path (sea level take off, hot day). In the prior art, the rows of leading edge holes are typically disposed parallel to the location of this aerodynamic leading edge and each row is spaced chordwisely an equal distance from the aerodynamic leading edge. This avoids having film cooling holes at a point where the greatest amount of dynamic velocity pressure is converted to static pressure. If this were to occur on the row of film cooling holes, the high static pressure might block the cooling air from flowing outwardly in the film cooling hole.

During the operative life of the engine, the aerodynamics of the turbine may change because of stator vane or rotor blade re-staggering to accommodate growth variations of the engine or other aerodynamic concerns. It is a simple matter, in such cases, to change slightly the angle of the root of the rotor blade with respect to the axis of the engine, changing the angle of attack of the airfoil with respect to the oncoming flow. This may shift the aerodynamic leading edge chordwisely so that it is aligned with a row of film cooling holes and blocks the flow of cooling air. The blockage requires a redesign of the cooling scheme to shift the cooling air holes away from the aerodynamic leading edge. A considerable amount of work in design and manufacturing is required to carry out this change. The task is even more complex for airfoils having internal impingement cooling of the leading edge region because the internal cooling requirements impose constraints on the location of holes extending through the airfoil.

Accordingly, scientists and engineers working under the direction of Applicant's assignee have sought to develop new cooling schemes for the leading edge region of the airfoil which are better able to accommodate changes in the location of the aerodynamic leading edge that result from an aerodynamic redesign of the turbine or a change in operative conditions of the engine.

DISCLOSURE OF INVENTION

This invention is predicated, in pan, on (1) recognizing that the aerodynamic leading edge of an airfoil may intersect the mechanical leading edge under operative conditions but will not lie coincident with the mechanical leading edge and (2) that this phenomenon may be used to make the leading edge region less sensitive to shifts in the location of the aerodynamic leading edge if (3) it is combined with a film cooling hole pattern having at least four spanwise rows that are staggered with respect to each other that have a critical spacing spanwisely and chordwisely, with respect to the diameter of the hole, if the diameter of the hole lies in a range of fifteen (15) mils (0.015 inches) to twenty-two (22) mils (0.022 inches).

According to the present invention, an array of film cooling holes for a leading edge region of an airfoil has at least four staggered rows spaced spanwisely and chordwisely one to the other in a predetermined manner with respect to diameter of the film cooling hole and parallel to the mechanical leading edge of the airfoil such that a shift in the aerodynamic leading edge blocks only a portion of the holes and only to an extent that does not interfere with effective cooling of the airfoil.

In accordance with one embodiment of the present invention, the hole diameter is equal to a diameter selected from a range of fifteen (15) mils to twenty-two (22) mils (0.015 inches to 0.022 inches); the chordwise spacing C lies in a range three times ($3\times$) the diameter to five times ($5\times$) the diameter of the holes; and, the spanwise spacing S lies in a range eight times ($8\times$) the diameter to twelve times ($12\times$) the diameter of the hole.

In accordance with one detailed embodiment, an additional row of film cooling holes is disposed on the mechanical suction side of the airfoil and spaced no more than three times ($3\times$) the chordwise spacing C from the rearward most array of holes in the leading edge region, and leaving at least two rows of holes on the suction side of the aerodynamic leading edge and one row on the pressure side of the aerodynamic leading edge.

A primary feature of the present invention is an airfoil which has a leading edge region having at least four rows of cooling air holes, three (3) being parallel to the mechanical leading edge and the fourth being parallel or coincident with the mechanical leading edge. Another feature is the spacing of the holes in the spanwise and chordwise direction which lies between predetermined maximum and minimum values related to the diameter of the film cooling holes. Another feature is the diameter of the film cooling hole which diameter is equal to a diameter selected from a range of fifteen (15) mils to twenty-two (22) mils (0.015 inches $\leq D \leq$ 0.022 inches). In one detailed embodiment, a primary feature is the location of an aerodynamic leading edge which is located such that, under the most severe operative condition of the engine, at least two rows of film cooling holes are on the suction side of the leading edge and at least one row of film cooling holes is on the pressure side of the aerodynamic leading edge.

A primary advantage of the present invention is the thermal fatigue life of an airfoil section which results from reducing thermal stresses in the leading edge region by effectively cooling the leading edge region. Another advantage of the present invention is the thermal fatigue life which results from the ability of adjacent cooling air holes to supply an adequate level of cooling air even as the aerodynamic leading edge intersects a row of film cooling holes. Still another advantage of the present invention is the flexibility in making aerodynamic changes to a turbine which results from the insensitivity of the level of airfoil cooling to changes in location of the aerodynamic leading edge within the pattern of film cooling holes.

BRIEF DESCRIPTION OF THE DRAWINGS

FIG. 1 is a side elevation view of a rotor assembly, partially in full and partially in section.

FIG. 2 is a front elevation view of the airfoil of the rotor blade shown in FIG. 1, showing the spanwise orientation of the cooling air holes.

BEST MODE FOR CARRYING OUT THE INVENTION

Figure 3:
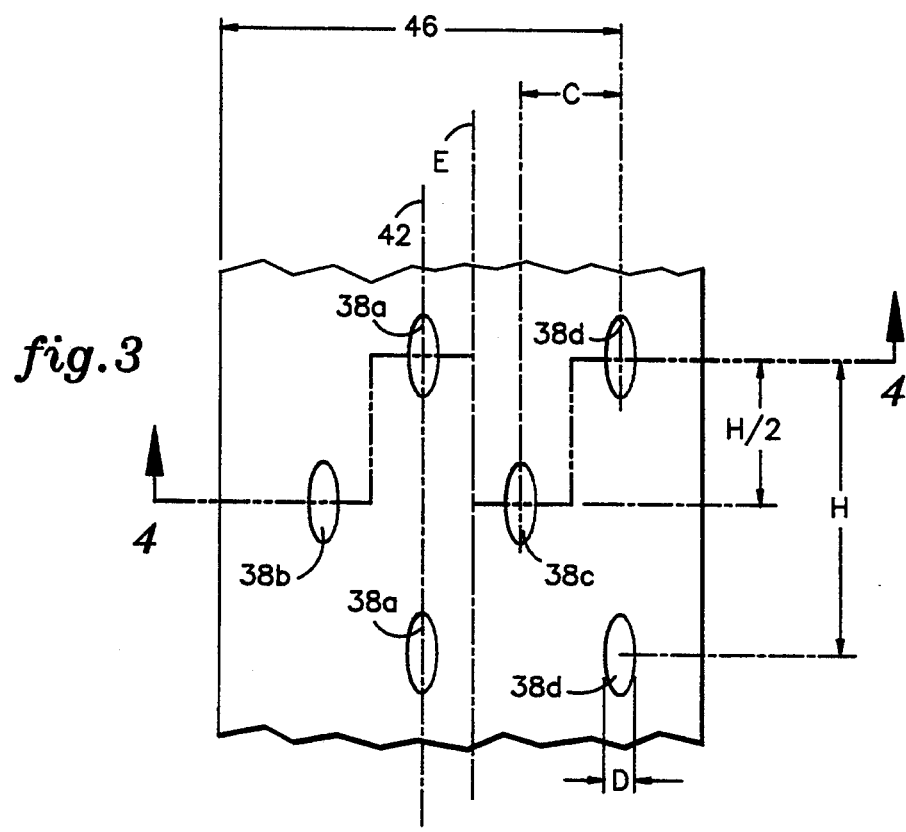
FIG. 3 is an enlarged developed view from the front of a portion of the airfoil shown in FIG. 1.

FIG. 1 is a side elevation view, partially in full and partially in section, of a rotor assembly 10 for an axial flow rotary machine such as a gas turbine engine. The rotor assembly has an axis of rotation $A_r$. The rotor assembly includes a rotor disk 12 having a rim region 14. A plurality of rotor blades, as represented by the single coolable rotor blade 16, extend outwardly from the rim region of the rotor disk. A flowpath for working medium gases 17 extends axially through the rotor blades.

The rotor blade 16 includes an airfoil 18, a platform 20, and a root 22. A plurality of blade attachment slots, as represented by the blade attachment slot 24, are disposed in the rim region 14. Each blade attachment slot is spaced circumferentially from the adjacent blade attachment slot and adapts the rotor disk to receive the root of an associated rotor blade.

A front side plate 26 and a rear side plate 28 are disposed axially with respect to the rotor blade 16, to trap the rotor blade on the rotor disk. Means for axially securing the side plates to the rotor disk, as represented by rivet 30, urge the front side plate in the axially downstream direction against the rotor disk, and the rear side plate in the axially upstream direction against the rotor disk.

Figure 4:
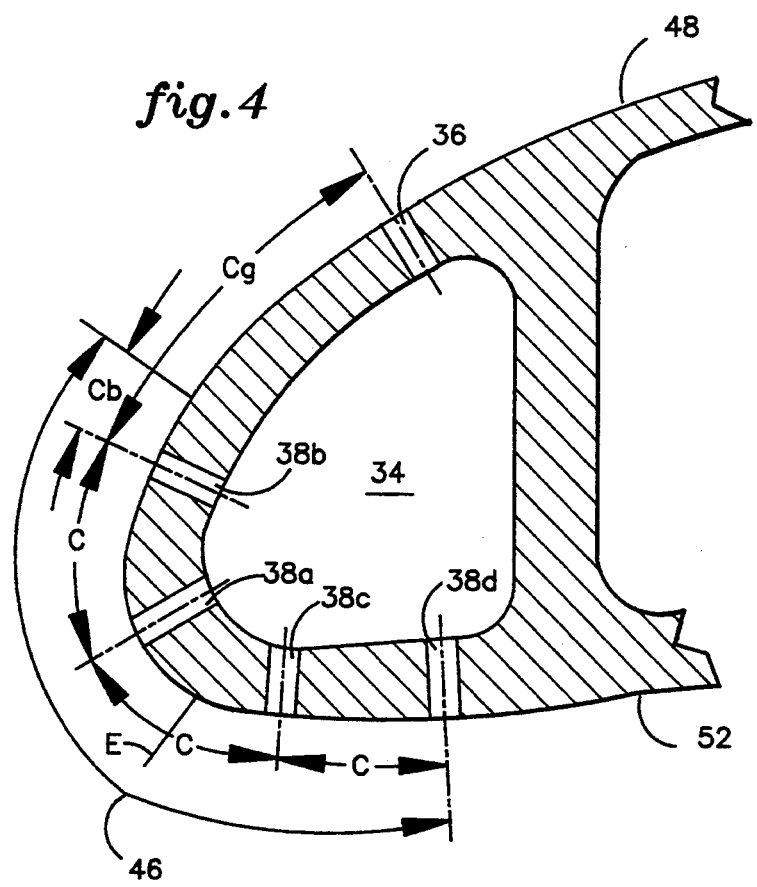
FIG. 4 is an enlarged cross-sectional view of the airfoil shown in FIG. 1, taken along the lines 4—4 of FIG. 3 with the rearmost portion of the airfoil broken away.

The rotor blade 16 is cooled by cooling air. A source of cooling air, such as a conduit or a hole 32 in the disk, provides cooling air to the root of the rotor blade. The rotor blade has a passage (not shown) extending internally of the blade from the root 22 to the airfoil 18 for flowing cooling air to the airfoil of the rotor blade. The airfoil is adapted by a spanwisely extending passage, as shown in FIG. 4 as passage 34, to be in flow communication with the root. A plurality of film cooling holes or cooling air holes extend through the airfoil to the exterior of the airfoil, as represented by the film cooling holes 36 and 38a which extend to the surface of the airfoil 18.

The surface of the airfoil section is defined by a mechanical leading edge 42 (commonly called the leading edge) and a mechanical trailing edge 44. The mechanical leading edge represents the furthest most forward portion of the airfoil section and is disposed in a leading edge region 46. The leading edge region is typically circular or elliptical in shape. A mechanical suction surface 48 is tangent to the leading edge region and extends rearwardly from the leading edge region to the trailing edge. A mechanical pressure surface 52 on the other side of the airfoil is tangent to the leading edge region and extends rearwardly from the leading edge region to the trailing edge on that side of the airfoil.

FIG. 2 is a front elevation view of the rotor blade 16 shown in FIG. 1. The leading edge region 46 has four rows of film cooling air holes, as represented by the film cooling air holes 38a, 38b in the leading edge region. An additional row of film cooling holes 36 is on the suction surface. These holes are commonly called gill holes. The blade attachment slot 24 is angled with respect to the axis of the engine. Accordingly, the row of holes 38a are coincident in the assembled condition with the leading edge 42 of the airfoil. The spanwise array of film cooling holes 38 is spaced from the tip and the platform 20 of the airfoil by a distance which is approximately ten percent (10%) of the spanwise length S of the airfoil. Each of the other rows of film cooling holes 38 in the leading edge region are also parallel to the row of holes 38a at the leading edge.

FIG. 3 is an enlarged developed view from the front of a portion of the airfoil shown in FIG. 2, showing the relative location of the holes 38 with respect to each other. The other rows of cooling air holes 38b, 38c, 38d also extend parallel to the mechanical leading edge and the row of holes 38a. Each hole has a diameter having the same value D as measured perpendicular to the axis of the hole. If drilled by a mechanical drilling method such as a fine drill, the holes are circular and the diameter D is selected from the range of fifteen (15) mils (0.015 inches) to twenty-two (22) mils (0.022 inches). In one embodiment, the diameter D is equal to fifteen (15) mils.

If the hole is drilled by a laser, the hole is slightly tapered inwardly. The minimum diameter occurs at the intersection of the hole with the inner surface of the airfoil and is the diameter D.

The spanwise spacing H of the holes from center line to center line lies in a range of eight times (8×) the diameter D to twelve times (12×) the diameter D of the hole, with this one embodiment being approximately ten times (10×) the diameter D of the hole. As can be seen in FIG. 3, the axis of the hole is angled in the radial direction such that the intersection of the hole with the surface of the airfoil forms an elliptical shape. The adjacent rows are staggered spanwisely such that each hole of a row is spaced by one-half the spanwise distance H from the center line of the hole in the adjacent row of holes. The spanwise spacing and staggering is selected to facilitate fabrication of the holes. Angling the holes causes the holes to overlap in the axial direction. Given the working tolerances, spacing is required to ensure that the holes do not intersect.

FIG. 4 is a cross-sectional view of a portion of the airfoil shown in FIG. 3 taken along the line 4—4 of FIG. 3 to show a portion an airfoil section. The axis $A_s$ or center line of each hole intersects the surface at an angle which is perpendicular to a line tangent to the surface at the point of intersection of the undrilled hole with the tangent line lying in the plane of the airfoil section. The leading edge region 46 has an elliptical or circular surface. As shown in FIG. 3 and FIG. 4, the chordwise spacing between rows of holes as measured from center line to center line lies in a range of approximately three times (3×) the diameter D of the holes to five times (5×) the diameter of the hole. The spacing is selected for structural reasons to ensure the airfoil is not unduly weakened by the film cooling holes. The chordwise spacing C for the embodiment shown is three and one-third times (3.33×) the diameter of the hole. In this one particular embodiment, the spacing is fifty (50) mils (0.050 inches) in a chordwise direction for the holes in the leading edge region and fifteen (15) mils (0.150 inches) in the spanwise direction. The row of holes 38d is disposed so that the center of the holes lies at the boundary of the leading edge region on the mechanical pressure surface. The row of holes 38b is spaced from the boundary of the leading edge region and lies three times (3×) to five times (5×) the hole diameter D (3D to 5D) within the leading edge region. The hole 36 on the suction surface is spaced rearwardly from the suction surface hole 38b by a distance which is less than or equal to three times (3×) the spacing C between the adjacent rows of holes in the leading edge region.

During operation of the rotor assembly shown in FIG. 1, hot working medium gases of the flowpath 17 are flowed over the airfoil of the rotor blade 16. These gases drive the rotor assembly about the axis of rotation causing rotational $A_r$ and thermal stresses in the rotor blades. As the hot working medium gases impact the leading edge region of each section of the airfoil, the gases have a stagnation point with respect to the surface of the airfoil section. The stagnation point, or point at which the maximum amount of kinetic velocity pressure is converted into static pressure, is commonly referred to as the aerodynamic leading edge E of the airfoil.

Flow on one side of the aerodynamic leading edge moves along the surface of the airfoil and thence along the suction surface to the trailing edge of the airfoil. This surface is commonly referred to as the aerodynamic suction surface or side of the airfoil and may include a portion of the mechanical pressure surface 52 of the airfoil. Flow on the other side of the aerodynamic leading edge flows along the surface of the airfoil and thence along the pressure surface 52 of the airfoil toward the trailing edge. This surface is commonly referred to as the aerodynamic pressure surface or side of the airfoil.

One example of a typical aerodynamic stagnation point is shown in FIG. 4 by the point E in the leading edge region and corresponds to a sea level take-off (hot day) operative condition of the rotor assembly. Other operative conditions may cause the stagnation point to shift chordwisely a small amount with respect to the point E, but such operative conditions will not cause the same level of thermal distress. It is recommended that at least two rows of film cooling holes be disposed on the aerodynamic suction side and at least one row on the aerodynamic pressure side. At a minimum, one row of cooling holes should be on the aerodynamic suction side and one row of holes on the aerodynamic pressure side.

Figure 5:
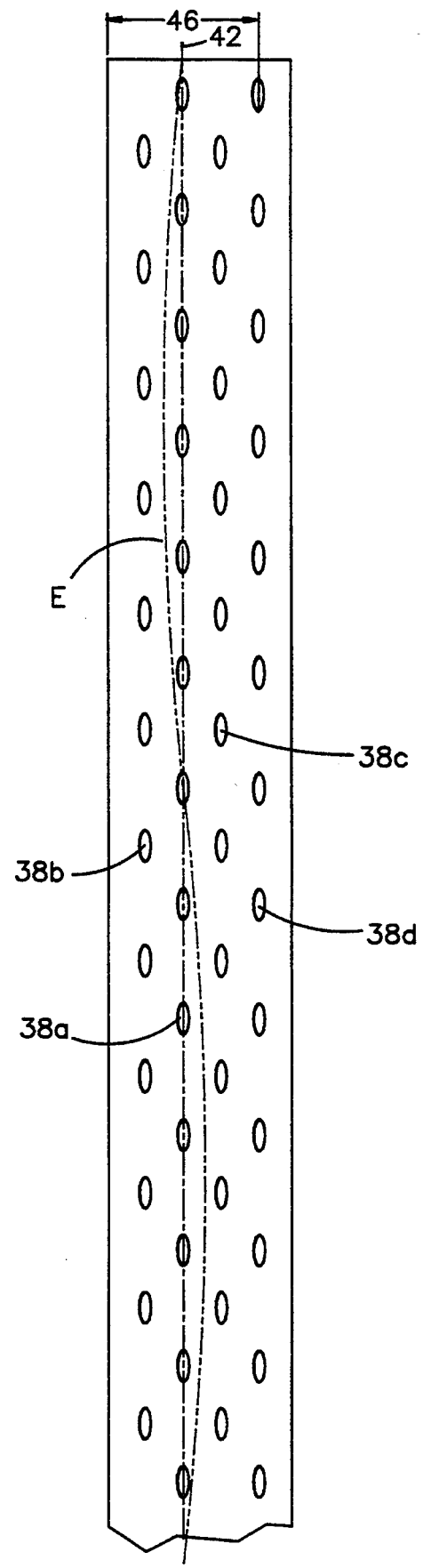
FIG. 5 is a schematic representation of the front view of the leading edge region of the airfoil shown in FIG. 1 and shows the relationship of the rows of cooling air holes to the aerodynamic leading edge.

FIG. 5 shows the relationship of the aerodynamic leading edge E (which connects the line of aerodynamic stagnation points) to the array of film cooling holes in the leading edge region 46. The aerodynamic leading edge extends in the spanwise direction is an S-shaped curve which intersects at one or more locations the parallel spanwisely extending rows of cooling holes in the leading edge region 38a, 38b, 38c, 38d. The size of the cooling air holes and the spanwise and chordwise spacing ensure adequate convective heat transfer and film cooling of the leading edge region even though one or more of the holes may be blocked by intersection of the rows with the aerodynamic leading edge. The aerodynamic leading edge is not parallel to any row of film cooling holes and so therefore does not block a great number of these film cooling holes. Accordingly, the aerodynamic leading edge may be shifted chordwisely by a redesign or a reorientation of the airfoils in advanced versions of the engines which have increased power or which were adjusted for unforeseen aerodynamic problems.

Figure 6:
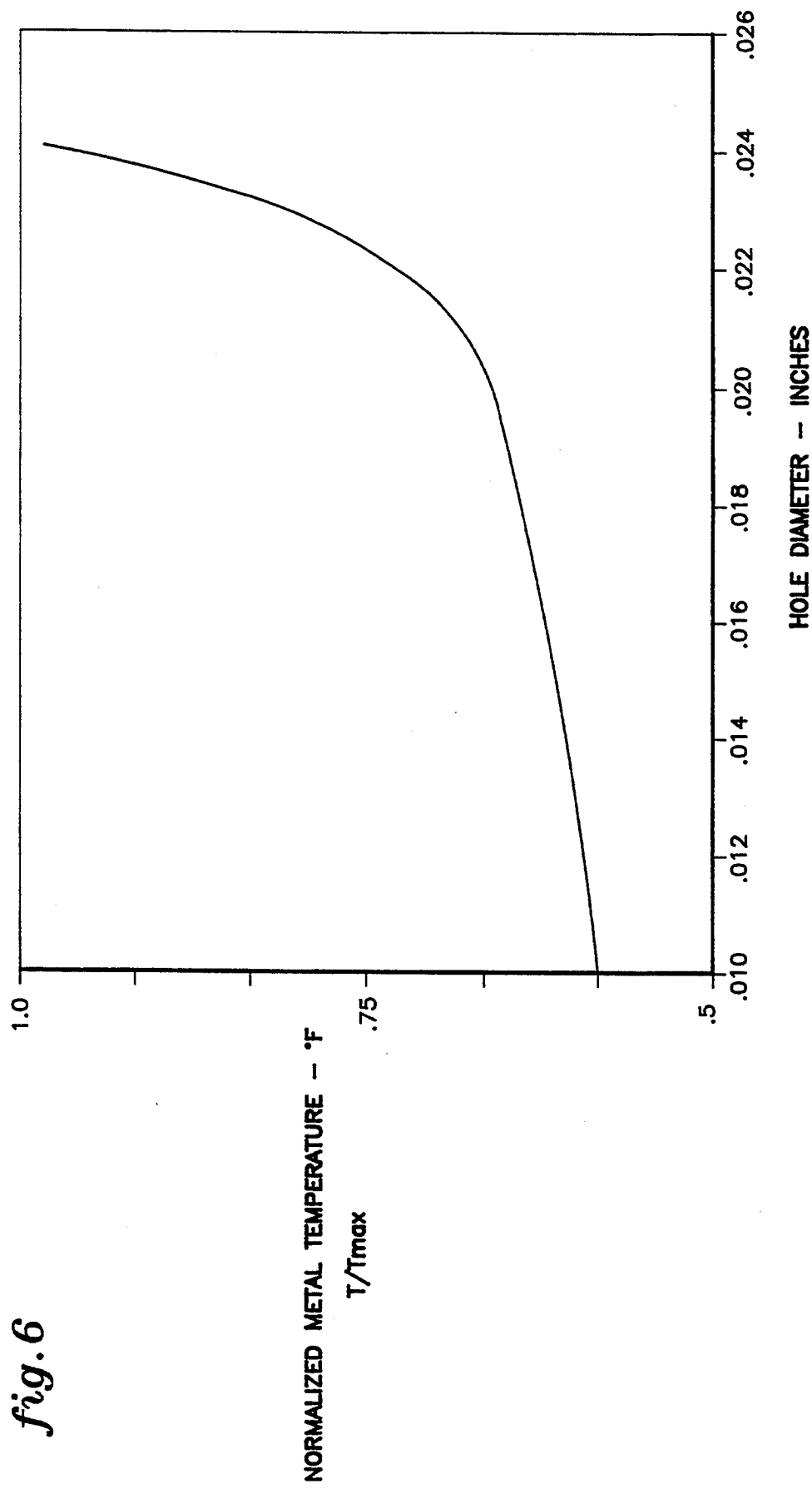
FIG. 6 is a graphical representation of normalized metal temperature in the leading edge region of an airfoil versus hole diameter for a given hole pattern, and spacing and operative condition.

FIG. 6 is a graphical representation of the effect of hole diameter on metal temperature for a leading edge region having an array of cooling air holes as illustrated in FIG. 1, FIG. 2, FIG. 3, and FIG. 4. In this particular array, the spanwise spacing of cooling air holes is 10D and chordwise spacing 3.33D with the hole 38d disposed on the boundary of the leading edge region and the hole 38b disposed within three (3) diameters of the boundary of the leading edge region. In this particular embodiment, the leading edge region is elliptical in shape. As shown in FIG. 6 it is clear that the metal temperature begins to rise very rapidly once a hole diameter of twenty-two (22) mils (0.022 inches) is exceeded. It is recommended that a hole diameter of twenty (20) mils (0.020 inches) be used for the upper limit because tolerances may cause variations in the size of the hole during the drilling process. A small increase in diameter of the hole may result in a large increase in metal temperature. Holes drilled by conventional means such as by small drills may result in a perfectly cylindrical hole. Holes drilled using a laser process will have a slight taper and the diameter D for such holes is measured at the minimum cross-section which typically occurs at the inner surface of the airfoil wall.

As shown in FIG. 5, the diameter D of the film cooling holes in the leading edge region is selected to provide for increased heat transfer in comparison with other constructions which use larger diameter holes. The adjacent rows of film cooling holes ensure that both the convective heat transfer and film cooling are adequately provided to locations of the airfoil which may encounter the aerodynamic stagnation point. For example, should the aerodynamic stagnation point intersect a cooling air hole of one of the rows, the adjacent rows provide adequate, effective cooling through conduction and then convection to the adjacent rows and their cooling holes. In those constructions where the rows are staggered, the adjacent holes provide film cooling in close proximity to the blocked hole. Accordingly, the airfoil can perform adequately in the severe environment of the gas turbine engine even when redesigned and when the aerodynamic stagnation point shifts.

Although the invention has been shown and described with respect to detailed embodiments thereof, it should be understood by those skilled in the art that various changes in form and detail thereof may be made without departing from the spirit and scope of the claimed invention.

I claim:

1. A coolable airfoil for a rotor assembly of a rotary machine having an axis of rotation Ar, the airfoil having a spanwise direction and a chordwise direction, a leading edge region, a mechanical leading edge and an aerodynamic leading edge disposed in the leading edge region, a trailing edge, a mechanical suction surface extending from the leading edge region to the trailing edge and a mechanical pressure surface extending from the leading edge region to the trailing edge, and having a passage for cooling air extending spanwisely on the interior of the airfoil, which comprises:

at least four rows of cooling air holes disposed in the leading edge region, at least four of which extend spanwisely parallel to the mechanical leading edge, each cooling air hole having an axis of symmetry $A_s$ and a minimum diameter D measured perpendicular to the axis $A_s$ which is equal to a diameter which lies in a range of fifteen (15) mils to twenty-two (22) mils (0.015 inches to 0.022 inches) (15 mils $\geq$ D $\geq$ 22 mils), the axes $A_s$ of the holes providing a reference for measuring chordwise distances at the surface between rows and spanwise distances between holes, each row of cooling air holes extending spanwisely and being spaced spanwisely at the surface from the axis $A_s$ of the adjacent hole in the row by a distance H which is equal to a distance which lies in a range of eight times (8×) the diameter D to twelve times (12×) the diameter D (8D $\geq$ H $\geq$ 12D) and spanwisely from the hole of the adjacent row by a distance such that the holes of adjacent rows are staggered spanwisely, each row of cooling air holes being spaced chordwisely at the surface from the adjacent row of holes by a distance C which is equal to a distance which lies in a range of three times (3×) the diameter D to five times (5×) the diameter D (3 $\geq$ C $\geq$ 5D) as measured on the surface of the airfoil, wherein the aerodynamic leading edge for a given operative condition of the rotor assembly is not parallel to the mechanical leading edge and the aerodynamic leading edge divides the airfoil into an aerodynamic suction side and an aerodynamic pressure side which each extend rearwardly from the aerodynamic leading edge to the trailing edge, and wherein the rows of cooling air holes are located with respect to the aerodynamic leading edge such that at least one row of said cooling air holes parallel to the mechanical leading edge in the leading edge region is on the aerodynamic suction side and at least one row of cooling air holes parallel to the mechanical leading edge is on the aerodynamic pressure side of the aerodynamic leading edge as measured in the chordwise direction.

2. The coolable airfoil of claim 1 wherein the leading edge region is elliptical in shape.

3. The coolable airfoil of claim 1 wherein the leading edge region is circular in shape.

4. The coolable airfoil of claim 1 wherein the minimum diameter D of the hole is equal to a value which lies in a range which has a maximum value of twenty (20) mils (0.020 inches).

5. The coolable airfoil of claim 4 wherein the hole tapers inwardly toward the interior of the airfoil and the minimum diameter of the hole occurs adjacent the cooling air passage.

6. The coolable airfoil of claim 4 wherein the hole is cylindrical in shape and has a constant diameter about the axis $A_s$.

7. The coolable airfoil of claim 4 wherein one of said rows of cooling air holes parallel to the mechanical leading edge is coincident with the mechanical leading edge.

8. The coolable airfoil of claim 7 wherein the airfoil has a row of cooling air holes on the suction surface which extends spanwisely, the row being spaced chordwisely by a distance $C_g$ from the rearmost row of cooling air holes in the leading edge region between the leading edge and the mechanical suction surface, the distance $C_g$ being three times ($3\times$) the distance C as measured on the surface.

9. A coolable airfoil for a rotary machine having an axis of rotation $A_r$, the airfoil having a spanwise direction and a chordwise direction, a leading edge region, a mechanical leading edge, and an aerodynamic leading edge disposed in the leading edge region, a trailing edge, a mechanical suction surface extending from the leading edge region to the trailing edge and a mechanical pressure surface extending from the leading edge region to the trailing edge, and having a passage for cooling air extending spanwisely on the interior of the airfoil, which comprises:

at least four rows of cooling air holes disposed in the leading edge region, at least three (3) of which extend spanwisely parallel to the mechanical leading edge and one of which is coincident with the mechanical leading edge, each cooling air hole having an axis of symmetry $A_s$ and a minimum diameter D measured perpendicular to the axis $A_s$ which is equal to fifteen (15) mils, the axis of symmetry intersecting the surface of the leading edge region at an angle such that the length of the hole at the surface in the spanwise direction is longer than the width of the hole in the chordwise direction, the axes $A_s$ of the holes providing a reference for measuring chordwise distances at the surface between rows and spanwise distances between holes, each row of cooling air holes extending spanwisely and being spaced spanwisely at the surface from the axis $A_s$ of the adjacent hole in the row by a distance H which is equal to ten times ($10\times$) the diameter D (H=10D) and spanwisely from the hole of the adjacent row by a distance of one-half H such that the holes of adjacent rows are staggered spanwisely, each row of cooling air holes being spaced chordwisely at the surface from the adjacent row of holes by a distance C which is equal to three and one-third times the diameter D (C=3.33D) as measured on the surface of the airfoil; and, a row of cooling air holes on the suction surface which extends spanwisely, the row being spaced chordwisely by a distance $C_g$ from the rearmost row of cooling air holes in the leading edge region between the mechanical leading edge and the mechanical suction surface, the distance $C_g$ being three times ($3\times$) the distance C as measured on the surface;

wherein the rearmost row of cooling air holes between the mechanical leading edge and the suction surface in the leading edge region is spaced forwardly from the boundary of the leading edge region with the suction surface by a distance $C_b$ which is equal to three times ($3\times$) the distance C and wherein the rearmost row of cooling air holes between the mechanical leading edge and the pressure surface in the leading edge region is on the boundary of the leading edge region with the pressure surface, and wherein the aerodynamic leading edge divides the airfoil into an aerodynamic suction side and an aerodynamic pressure side which each extend rearwardly from the aerodynamic leading edge to the trailing edge, and wherein the rows of cooling air holes are located with respect to the aerodynamic leading edge such that at least two rows of cooling air holes are on the aerodynamic suction side and at least one row of cooling air holes is on the aerodynamic pressure side of the aerodynamic leading edge as measured in the chordwise direction.

* * * * *